(No Model.)
G. EVANS.
DENTAL THERMAL INSTRUMENT.
No. 445,766. Patented Feb. 3, 1891.
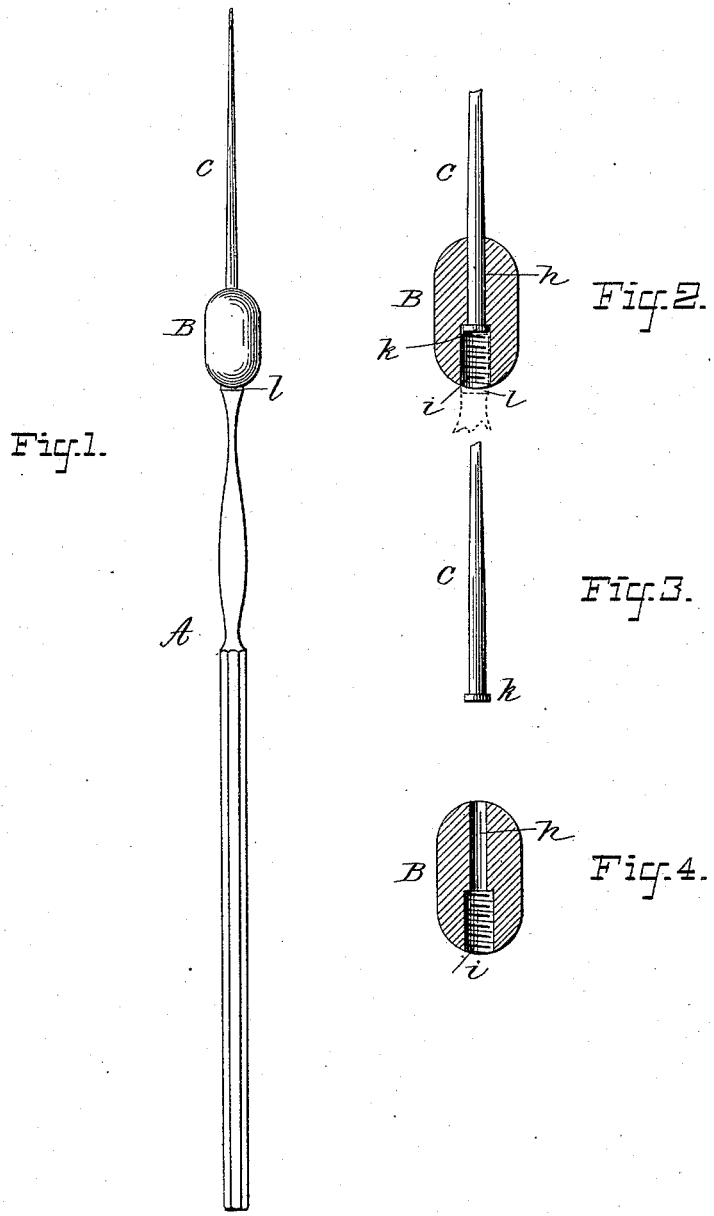

UNITED STATES PATENT OFFICE.

GEORGE EVANS, OF NEW YORK, N. Y.

DENTAL THERMAL INSTRUMENT.

SPECIFICATION forming part of Letters Patent No. 445,766, dated February 3, 1891.

Application filed November 12, 1890. Serial No. 371,195. (No model.)

*To all whom it may concern:*

Be it known that I, GEORGE EVANS, a citizen of the United States, residing at New York, in the county of New York and State of New York, have invented certain new and useful Improvements in Dental Thermal Instruments; and I do hereby declare the following to be a full, clear, and exact description of the invention, such as will enable others skilled in the art to which it appertains to make and use the same.

My invention relates to improvements in the construction of the "dental tool" or heat-applying intruments for which Letters Patent No. 390,576 were granted to me, and dated October 2, 1888. As described and illustrated in the said patent, the probe is screwed into the heat-storing bulb-coupling, and as from use the probe wears away at the point and in course of time is rendered unfit for use it becomes necessary to remove it from the bulb-coupling and supply its place with another. Considerable difficulty, however, is encountered in removing the old probe, as (it being made generally of silver) the constant heating of the instrument causes the screw-threads on the coupled end of the probe to adhere to the copper, an imperfect weld being formed, in consequence whereof the unscrewing of the probe is rendered difficult and in many cases impossible.

To obviate this defect in the construction of my said patented instrument is the object of my present invention, which consists in dispensing with the screw-thread connection between the probe and the bulb-coupling, and in lieu thereof providing the coupled end of the probe with a head and the bulb with a counterbored hole or socket through which the probe is passed until its head rests against the bottom of the counterbore, while the coupled end of the handle of the instrument is screwed into the counterbore until it bears against the head of the probe, which is thereby held firmly in place, but is easily removable by merely unscrewing the handle of the instrument.

In the accompanying drawings, Figure 1 represents my improved dental thermal instrument; Fig. 2, a sectional view of the bulb-coupling with the probe inserted in the hole and with its head resting against the bottom of the counterbore; Fig. 3, the probe removed from the pulb-coupling, and Fig. 4 a longitudinal section of the bulb-coupling.

Referring to the drawings, A indicates the handle of the instrument, which may be made of steel or other suitable material; B, the bulb-coupling, which is preferably made of copper on account of the heat-retaining properties of that metal, though other metal suitble for the purpose may be substituted, and C the probe, which by preference should be made of silver. Through the bulb-coupling longitudinally is made a hole $h$, and at one end this hole is counterbored and threaded, as at $i$. The probe C at its large end is formed with a suitable head $k$. The handle A has its end $l$, which connects with the bulb-coupling, screw-threaded to adapt it to screw into the counterbore $i$. The fixing of the probe in the bulb-coupling is done by passing the small end of the probe up through the counterbore and thence through the hole $h$ until its head rests against the bottom of the counterbore, as shown in Fig. 2. Then, the handle being screwed into the counterbore until its end bears against the head, the latter is held firmly between the end of the handle and the bottom of the counterbore, as indicated in Fig. 2. By this mode of fastening the probe in the bulb-coupling the heating of the bulb can have no effect in causing the probe to become fixed in the bulb, and it can be easily removed, as the handle, being large and strong, can be unscrewed without difficulty, after which the probe can be withdrawn without using any force.

I claim—

In a dental thermal instrument, the combination of a probe provided with a suitable head in its coupling end, a coupling provided with a counterbored socket or hole adapted to receive and retain the headed end of the probe, and a handle screwed or otherwise fastened in the counterbore of the hole or socket and which bears against the head of the probe and clasps or fastens the head against the counterbore, substantially as specified.

In testimony that I claim the invention above set forth I have affixed my signature in presence of two witnesses.

GEORGE EVANS.

Witnesses:
DAVID PROVEN,
ADOLPH MAISNER.